United States Patent
VanValkenburgh

(10) Patent No.: US 7,631,735 B1
(45) Date of Patent: Dec. 15, 2009

(54) MOUNTING SYSTEM FOR ROTARY DAMPER

(76) Inventor: Charlie N. VanValkenburgh, 1101 Harrison Ave., Huntsville, AL (US) 35801

( * ) Notice: Subject to any disclaimer, the term of this patent is extended or adjusted under 35 U.S.C. 154(b) by 645 days.

(21) Appl. No.: 11/416,523

(22) Filed: May 3, 2006

(51) Int. Cl.
*B62K 21/00* (2006.01)

(52) U.S. Cl. ...................... 188/290; 280/771
(58) Field of Classification Search ............ 188/290, 188/309, 310; 280/272, 771
See application file for complete search history.

(56) References Cited

U.S. PATENT DOCUMENTS

| | | | |
|---|---|---|---|
| 6,708,795 B2 * | 3/2004 | Hasegawa et al. ........... | 180/423 |
| 6,899,208 B2 | 5/2005 | VanValkenburgh | |
| 7,258,211 B2 * | 8/2007 | Yamada ...................... | 188/306 |
| 7,258,356 B2 * | 8/2007 | Okazaki et al. ............. | 280/272 |
| 2002/0157909 A1 * | 10/2002 | Hasegawa et al. ........... | 188/290 |
| 2004/0200680 A1 * | 10/2004 | Yamada et al. .............. | 188/293 |
| 2005/0087969 A1 * | 4/2005 | Okazaki et al. ............. | 280/771 |
| 2006/0207845 A1 * | 9/2006 | Gogo et al. ................. | 188/290 |
| 2006/0220340 A1 * | 10/2006 | Seki et al. ................... | 280/272 |
| 2008/0105506 A1 * | 5/2008 | Norman ...................... | 188/310 |

* cited by examiner

*Primary Examiner*—Christopher P Schwartz
(74) *Attorney, Agent, or Firm*—Adam K. Sacharoff; Much Shelist

(57) ABSTRACT

A mounting system for a rotary damper includes a base mount, a damper mount member, a damper arm, and a frame bracket including a spherical bearing. The base mount and frame bracket are designed to be mounted on a motorcycle and the damper mount member is rotatably connected to the base mount. The damper mount member and the damper arm are designed to be connected to the rotary damper. The damper arm is connected to the frame bracket using the spherical bearing and can move axially and rotationally with respect to the bearing. The mounting system allows the damper to move with respect to the motorcycle and prevents unnecessary forces from damaging the damper. The shapes and sizes of the various parts of the mounting system may vary depending on the type of motorcycle being used with the mounting system.

20 Claims, 4 Drawing Sheets

MOUNTING SYSTEM FOR ROTARY DAMPER

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to mounting systems for rotary dampers used on motorcycles.

More particularly, this invention pertains to mounting system for a rotary damper that reduces the amount of undamped motion associated with typical prior art mounting systems, while at the same time preventing any binding or interference with smooth steering action that results when these prior art systems are modified in an attempt to reduce this undamped motion.

Under certain conditions, the steering system in a motorcycle can become unstable and develop rapidly increasing rotational oscillations in the steering head of the steering system. This condition is commonly referred to as "head shake" and results, in part, because the steering geometry of a motorcycle, and particularly a racing motorcycle, is designed so that there is a compromise between front end stability and easy and quick steering.

During normal operating conditions, a motorcycle steering system may be stable and safe. However, if the steering system is disturbed by bumps, reduced loads during acceleration, or the front wheel contacting the ground after it has been raised in the air during very quick acceleration, head shake may occur.

Head shake is not a new phenomenon and is typically addressed using a steering damper, which reduces head shake and maintains a motorcycle in a safe operation condition. One particular type of steering damper that is known in the art is a rotary damper that mounts coaxially with the steering pivot axis of a motorcycle. More specifically, this type of damper generally mounts to the top surface of a top triple clamp included as part of the motorcycle steering system and includes a damped member that acts on the frame of the motorcycle to provide the resistance forces necessary for the damping effect. An example of a prior art rotary damper is described in U.S. Pat. No. 6,899,208, which was issued to the applicant for the present invention and is hereby incorporated by reference in its entirety.

Mounting systems for rotary dampers are also known in the art. These systems are typically designed to allow for misalignment in the damper, the damped member, and the motorcycle frame interface. The more common designs for these systems employ a slot in the damped member that interfaces with a peg or post mounted to the frame of a motorcycle. This type of design, however, has several disadvantages. For example, this type of design requires clearances, or free play, at the interface of the members that must be large enough to allow for rotational misalignment, as well as small amounts of linear motion as the steering head is rotated. This is true because the damper axis is usually mounted non-concentric with the steering axis of the motorcycle. These clearances cause a certain amount of undamped motion to occur during operation of a motorcycle, which is undesirable. While the clearances can be reduced in order to reduce this undamped motion, this causes the mounting system to bind and interfere with smooth steering action—another equally undesirable result.

Another disadvantage of existing prior art mounting systems is that these systems are mounted over other motorcycle steering elements and must be completely removed before maintenance can be performed on these elements.

What is needed, then, is a mounting system for a rotary damper on a motorcycle that eliminates the disadvantages associated with existing prior art mounting systems for these dampers.

BRIEF SUMMARY OF THE INVENTION

Accordingly, one object of the present invention is to provide a mounting system for a rotary damper on a motorcycle that eliminates undamped motion associated with existing prior art mounting systems.

Another object is to provide a mounting system that eliminates the free play in existing systems and allows for tight tolerances in the mounting system, but that does not bind or interfere with smooth steering action.

Still another object of the present invention is to provide a mounting system that can be easily removed so that maintenance can be performed on other motorcycle steering elements.

These objects, as well as other objects that will become apparent to one of ordinary skill in the art upon reading and practicing the information contained in the following disclosure, are satisfied by the mounting system of the present invention. The mounting system includes a base mount, a damper mount member, a damper arm, a spherical bearing, and a frame bracket. The base mount and the frame bracket are designed to be connected to the frame of a motorcycle. The damper mount member is rotatably connected to the base mount. The base mount and the damper arm are both designed to be rigidly connected to a rotary damper, such as the one described in U.S. Pat. No. 6,899,208 discussed previously. The spherical bearing is inserted into an opening in the frame bracket and the damper arm is connected to the frame bracket using the spherical bearing. The damper arm includes a small cylindrical pin that is sized so that it fits inside an opening defined in the spherical bearing.

The shape and size of the base mount may vary depending on the type of motorcycle that is being used with the present invention. The shape and size of the damper mount member may also vary for similar reasons. The pin or bolt used to rotatably connect the damper mount member to the base mount may include a smooth shaft, which allows the damper mount member to rotate freely around the shaft, or a threaded shaft, which still allows the damper mount member to rotate around the shaft but not as freely as the smooth shaft.

In operation, the mounting system of the present invention eliminates virtually all free play that is found in conventional prior art systems, while at the same time providing six degrees of movement so that the rotary damper is never placed in a bound condition. This prevents the rotary damper from being exposed to unnecessary forces that can damage the damper and cause seals in the damper to leak.

The present invention can be used with a variety a different types of rotary dampers that are designed to be mounted to the top of a motorcycle steering mechanism and that include a damped member extending from the lower face of the damper that interfaces with a connecting member on the frame of the motorcycle.

The mounting system of the present invention allows a rotary damper to be connected to the top triple clamp of a motorcycle steering system coaxially with the steering shaft and rotated about an axis that is traverse to the longitudinal axis of the motorcycle. This provides one axis of freedom which is necessary for unbound movement of the rotary damper. In addition, this feature of the invention allows the rotary damper to be rotated about this axis to provide quick and easy access to the top of the steering stem for maintenance or removal.

The arrangement of the damped member and the spherical bearing allows axial, as well as rotational movement, at this interface. This provides two additional axes of movement which are necessary for completely free movement of the rotary damper relative to the motorcycle frame. The frame bracket, which includes the spherical bearing, can be easily removed to facilitate removal of the rotary damper and maintenance on the steering system of the motorcycle.

DETAILED DESCRIPTION OF THE INVENTION

Figure 1:
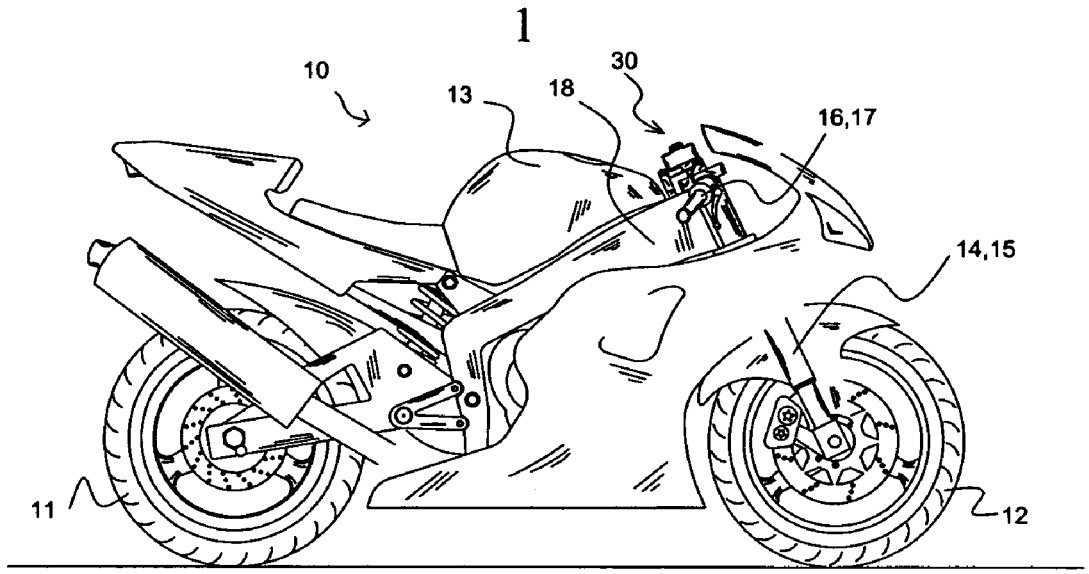
FIG. 1 is a side view of a conventional motorcycle showing one embodiment of the mounting system of the present invention being used to connect a prior art rotary damper to the motorcycle.

Referring to the drawings, FIG. 1 shows a conventional motorcycle 10 that includes one embodiment of the mounting system 30 of the present invention. Although the mounting system of the present invention is discussed in connection with a motorcycle, the invention is not limited to this type of application and can be used with any system that requires rotational damping. Motorcycle 10 includes a real wheel 11, a front wheel 12, a gas tank 13, and a rigid frame 18. Parallel forks, 14 and 15, support the motorcycle and provide suspension for front wheel 12.

Figure 2:
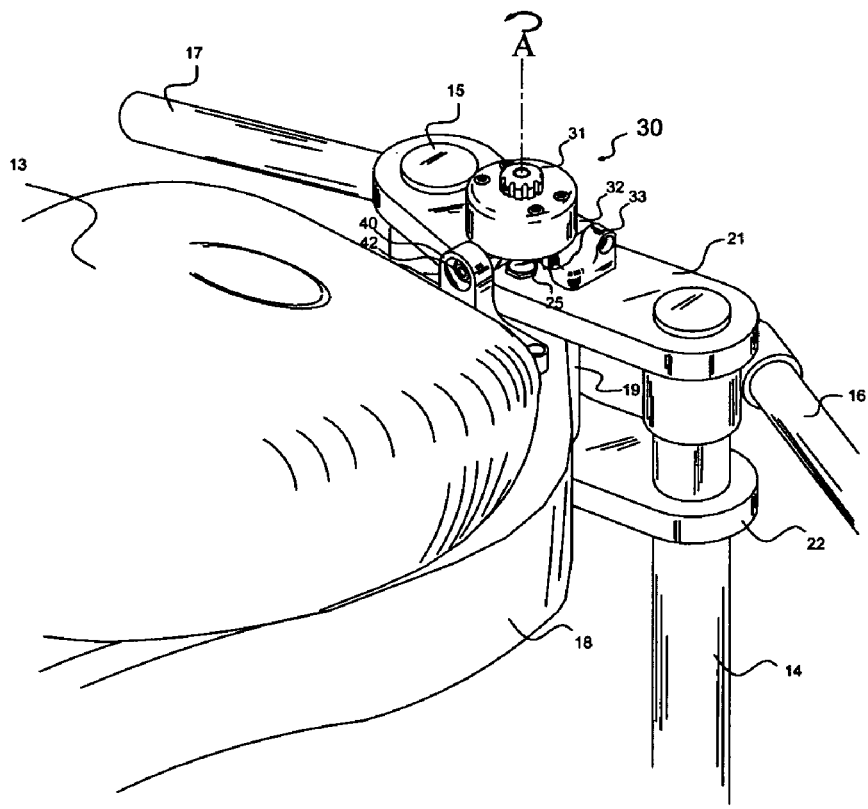
FIG. 2 is an enlarged view showing how the embodiment of the mounting system shown in FIG. 1 is connected to the motorcycle and rotary damper in that figure.

As shown in FIG. 2, steering is controlled by inputs from a rider to the left and right handlebars, 16 and 17, which are mounted on the top of parallel forks 14 and 15. Forks 14 and 15 are rigidly mounted in an upper triple clamp 21 and a lower triple clamp 22, both of which are rotatably connected to rigid frame 18 through steering head 19.

Figure 3:
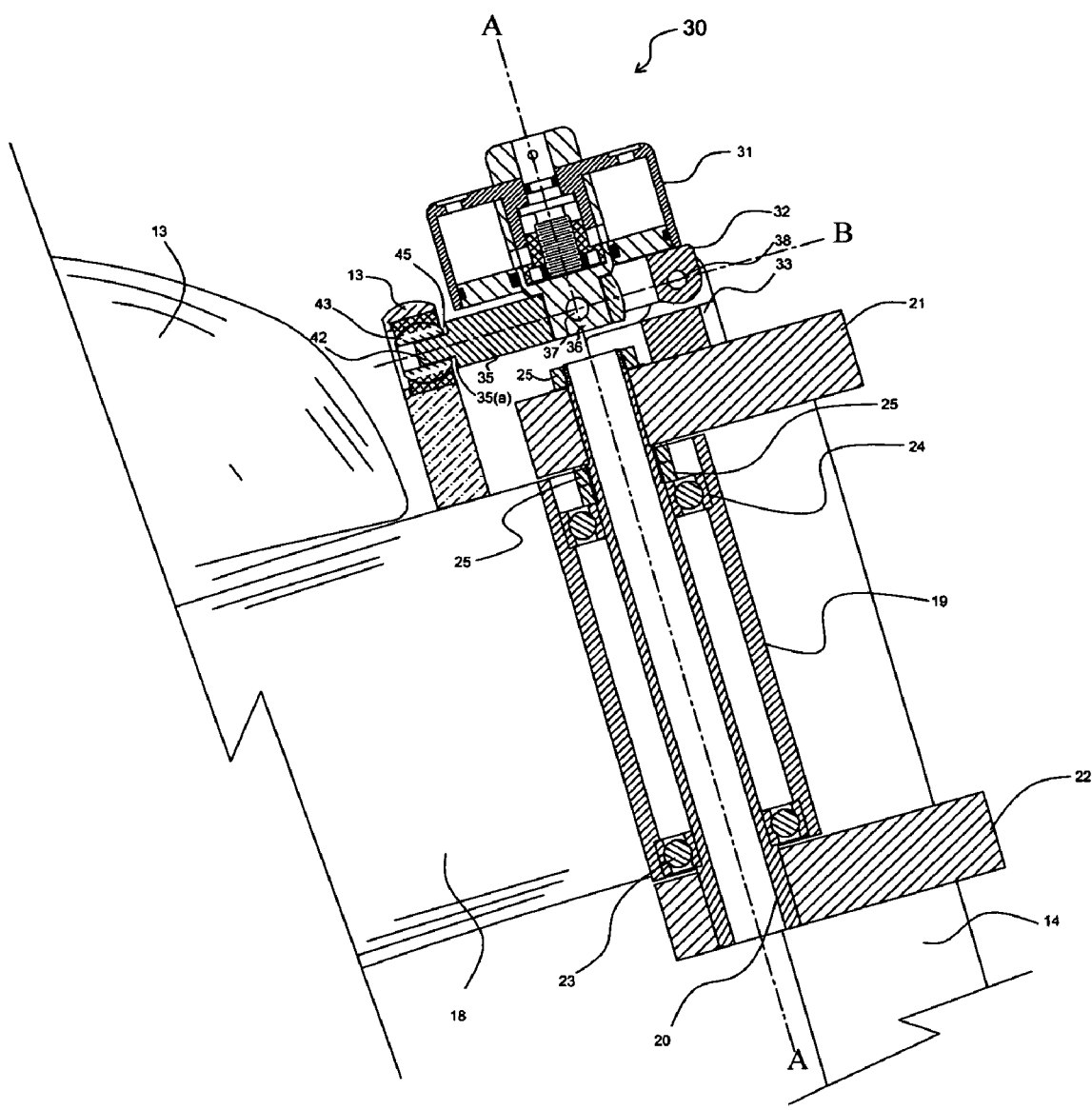
FIG. 3 is a cross sectional view showing the motorcycle, rotary damper, and embodiment of the mounting system shown in FIG. 1.

Referring to FIG. 3, the steering mechanism for motorcycle 10 includes a steering stem 20 concentrically supported by bearings 23 and 24 inside steering head 19. Steering stem 20 defines the rotational axis of the steering system and is shown in FIG. 2 as axis A. Steering stem 20 is rigidly attached by press fit to lower triple clamp 22 and is affixed to top triple clamp 21 using nuts 25. Forks 14 and 15 are generally offset to the forward end of triple clamps 21 and 22.

Figure 4:
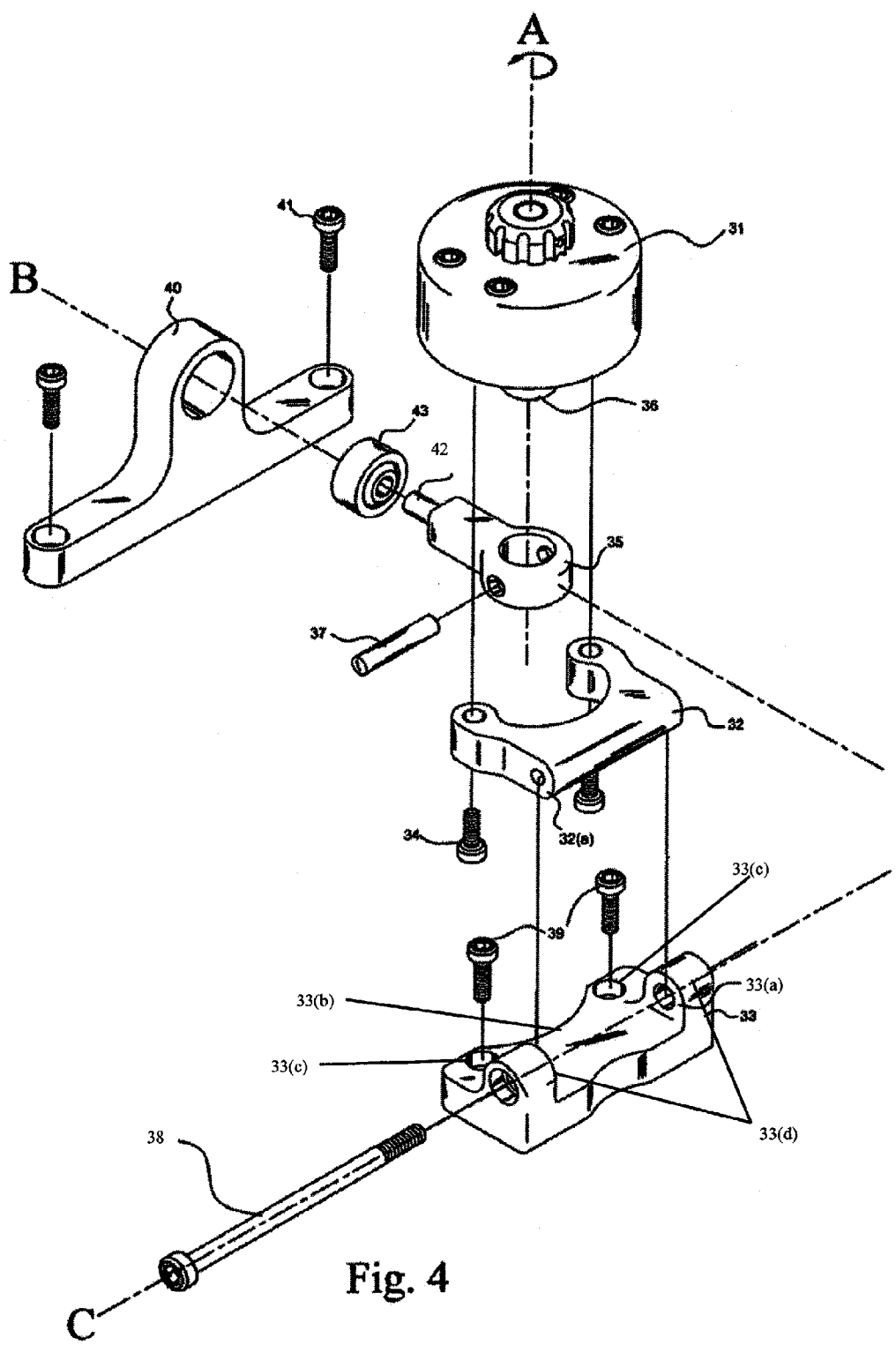
FIG. 4 is an exploded view of one embodiment of the mounting system of the present invention and a prior art rotary damper.

Turning now to FIG. 4, the mounting system 30 of the present invention includes a damper mount member 32, which is rigidly connected to a rotary damper 31. Rotary damper 31 is described in detail in U.S. Pat. No. 6,899,208 discussed previously and that description will not be repeated here except when necessary to describe how the present invention is used with that damper. Damper mount 32 is generally unshaped so that it does not interfere with the rotation of damper arm 35. Damper arm 35 is rigidly attached to damped shaft 36, which protrudes from the base of damper 31, using a pin 37 or a bolt (not shown). Damped shaft 36 is generally located coaxially with steering stem 20 of motorcycle 10 so that rotation of the motorcycle steering system will result in minimal movement of damper 31 relative to motorcycle frame 18.

Damper mount 32 is rotatably affixed to base mount 33 using a pin or bolt 38 that includes a smooth shaft and a threaded portion on one end. The smooth shaft allows damper mount member 32 to rotate freely about axis C. In an alternative embodiment (not shown), the entire shaft of bolt 38 is threaded and does not include a smooth portion. Damper mount 32 can still rotate about axis C in this embodiment, but the movement is more limited by the threads of bolt 38. The use of these threads eliminates free play between damper mount 32 and base mount 33 that is present when a smooth shaft is used and may be undesirable under certain conditions.

Base mount 33 includes a substantially a substantially flat rectangular portion 33(b) that include first and second base mounting holes 33(c), which as detailed below are used to secure base mount 33 to the triple clamp 21 by bolts or screws 39. Base mount 33 also includes first and second protrusions 33(d) extending upward from the upper surface of the substantially flat rectangular portion 33(b). The first and second protrusions 33(d) aid in defining the mating faces 33(a) used to rotatably connect damper mount 32 to base mount 33.

Base mount 33 is rigidly attached to top triple clamp 21 by bolts or screws 39. The axis C of pin or bolt 38 is generally traverse to the longitudinal axis of the motorcycle. The pin or bolt 38 may be replaced with shoulder bolts, which would be inserted from each side of base mount 33, or any other means that would facilitate free rotation about axis C. The interface of damper mount 32 and base mount 33 is such that there is a tight fit between mating faces 33(a) and 32(a) that prevents free play along axis C. This allows for variations in the height of top triple clamp 21, as well as allowing for damper arm 35 to be oriented non-parallel to top triple clamp 21. If a threaded bolt 38 is used, however, the fit between mating faces 33(a) and 32(a) does not have to be as tight.

Figure 5:
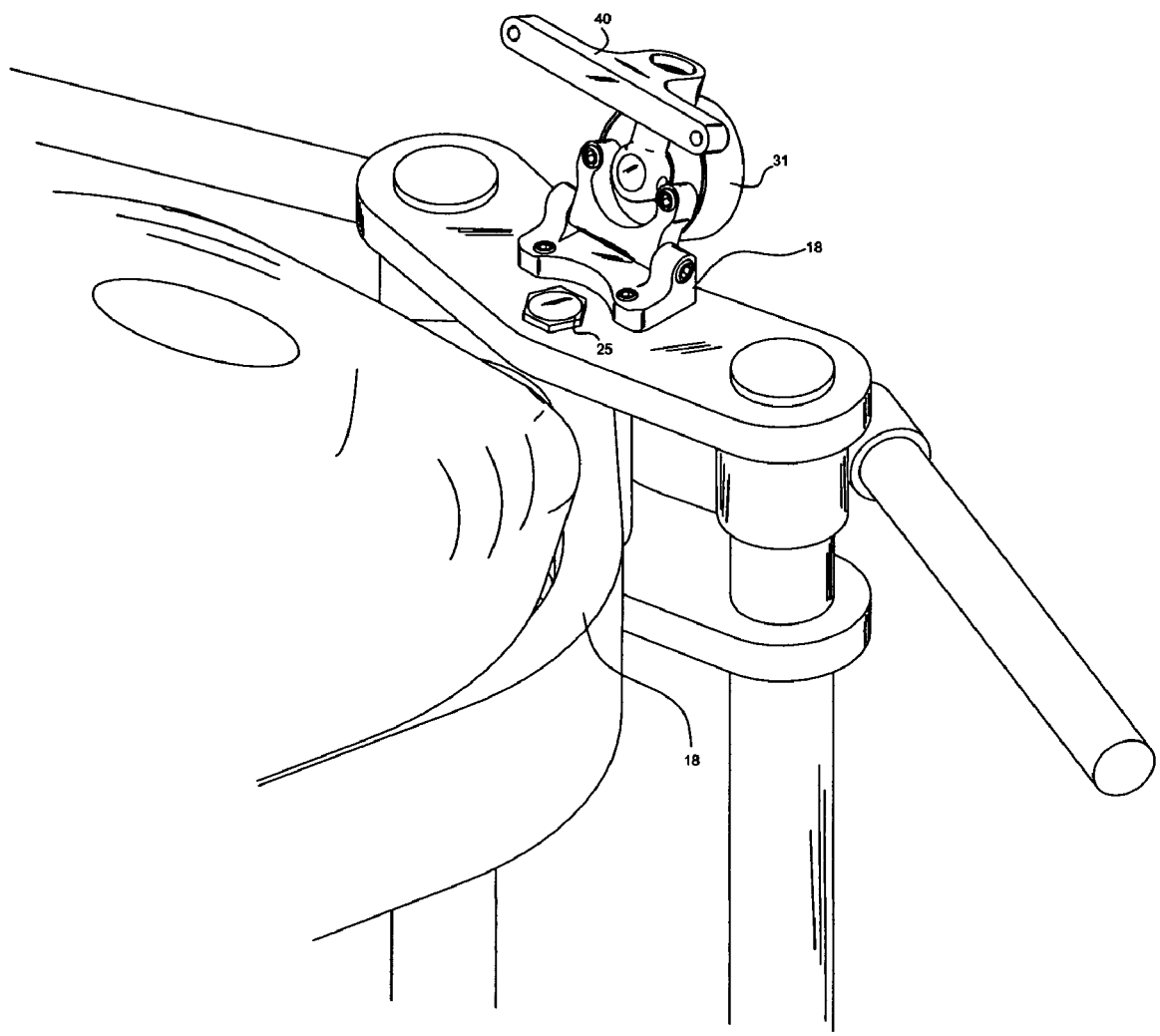
FIG. 5 is an enlarged view showing the embodiment of the mounting system from FIG. 1 after it has been rotated upward to allow access to the motorcycle steering system.

Referring to FIG. 5, the rotational hinged relationship between base mount 33 and damper mount member 32 allows the damper 31 to be rotated out of the way after bolts 41, which are used to affix frame bracket 40 to an upper portion of frame 18, have been removed. This facilitates access to steering stem nut 25, which is used for removal and maintenance purposes.

As shown in FIG. 3, damper arm 35 protrudes generally in a rearward direction and engages frame bracket 40. Frame bracket 40 is rigidly affixed to an upper portion of frame 18 just forward of gas tank 13 using bolts or screws 41. Frame bracket 40 also includes a spherical bearing 43 that is press fit into an opening located in an upper portion of frame bracket 40. Damper arm 35 includes a cylindrical feature or pin 42 on one end that engages with spherical bearing 43. Cylindrical pin 42 may be a machined feature in a solid material like aluminum or steel, or it may be a pin or shaft that is a separate piece pressed or screwed into damper arm 35. The materials and length of damper arm 35, as well as cylindrical pin 42, are determined as necessary for each application and may vary from one application to another.

Frame bracket 40 is oriented and affixed to a top portion of frame 18 so that there is a specified clearance 45 between the end of damper arm 35(a) and spherical ball 43. Clearance 45 allows cylindrical pin 42 of damper arm 35 to move freely along a longitudinal axis B inside spherical ball 43. This configuration provides a degree of freedom in the longitudinal axis B for mounting variables, thermal expansion, operating oscillations, and machining tolerances, while simultaneously preventing vertical and horizontal movement. Ideally, the fit should be a machined sliding fit with little or no free play. Spherical bearing 43 will orient itself to be concentric with the axis of damper arm 35 regardless of the orientation of damper 31 to frame bracket 40.

During operation, spherical ball 43 can rotate, cylindrical pin 42 can slide inside and out of spherical ball 43, and damper mount 32 can rotate on base mount 32 as necessary to compensate for misalignments and movement created by the rotation of the steering system. These three axes of rotation, coupled with the longitudinal movement along the B axis provide a non-binding damped action of the steering mechanism with minimal free play.

Various modifications to frame bracket 40, base mount 33, and damping mount member 32 may be made depending on the requirements for a particular application or a particular type of motorcycle. For example, the length of base mount 33 may vary so that base mount 33 may be mounted to a motorcycle using holes that have already been made in the motorcycle's top triple clamp. This prevents a user from having to drill holes in the top triple clamp in order to mount base mount 33. The length of the unshaped portion of damping member 32 may vary depending on how far away base mount 33 is mounted from the steering axis of a motorcycle. In addition, frame bracket 40 may be taller or shorter and may include a hollowed out lower portion in certain applications.

Thus, although there have been described particular embodiments of the present invention of a new and useful Mounting System for Rotary Damper, it is not intended that such references be construed as limitations upon the scope of this invention except as set forth in the following claims.

What is claimed is:

1. A mounting system, comprising:
    a base mount adapted to be connected to a steering mechanism defined on a motorcycle;
    a damping mount member rotatably connected to the base mount and adapted to be fixed to a rotary damper for a motorcycle;
    a frame bracket adapted to be connected to a frame member defined on the motorcycle and including a spherical bearing;
    and a damping arm adapted to be connected to a damping shaft extending outward from the rotary damper and connected to the frame bracket using the spherical bearing, whereby the rotary damper is movable with respect to both the frame member and steering mechanism on the motorcycle.

2. The mounting system of claim 1, wherein the base mount includes a substantially flat rectangular portion, a first and second base mounting hole defined in the substantially flat rectangular portion, and a first and second protrusion extending upward from an upper surface of the substantially flat rectangular portion.

3. The mounting system of claim 2, wherein the first and second protrusions are substantially parallel to one another.

4. The mounting system of claim 3, wherein: the first protrusion includes a first opening that is threaded; and the second protrusion includes a second opening that is partially threaded.

5. The mounting system of claim 1, wherein the base mount includes a curved notch defined in one side of the base mount.

6. A mounting system, comprising:
    a base mount having a pair of base mounting openings adapted for mounting the base mount to a steering mechanism and a pair of protrusions extending upward from an upper surface of the base mount;
    a damping member having a pair of lateral openings to be rotatably connected to the Pair of protrusions defined by the base mount, the damping member further including a pair of rotary openings adapted for securing the damping member to a rotary damper;
    a frame bracket including a spherical bearing and a pair of frame bracket openings adapted for mounting the frame bracket to a frame; and
    a damping arm having one end connected to the frame bracket using the spherical bearing and having another end connected to the rotary damper.

7. The mounting system of claim 6, wherein the damping member is rotatably connected to the base mount using a threaded bolt or pin.

8. The mounting system of claim 6, wherein the damping member is rotatably connected to the base mount using a bolt or pin that includes a smooth shaft and threads on one end.

9. The mounting system of claim 6, wherein the damping member is horseshoe shaped and includes a first damping member mounting hole defined in a first arm and a second damping member mounting hole defined in a second arm.

10. The mounting system of claim 9, wherein the damping member further includes a damping member channel that is used to rotatably connect the damping member to the base mount.

11. The mounting system of claim 10, wherein the damping member channel is threaded.

12. The mounting system of claim 6, wherein the damping arm includes a ring shaped damping shaft opening defined on a first end and a cylindrical pin defined on a second end.

13. The mounting system of claim 12, wherein the damping arm includes damping arm mounting openings defined in the damping shaft opening.

14. The mounting system of claim 12, wherein the damping arm has substantially flat upper and lower portions and cylindrically shaped sides.

15. The mounting system of claim 12, wherein the damping arm has a main damping arm diameter and the cylindrical pin has a diameter that is smaller than the main damping arm diameter.

16. The mounting system of claim 12, wherein the cylindrical pin is hollow.

17. The mounting system of claim 12, wherein the cylindrical pin is disposed within a spherical bearing opening defined in the spherical bearing and can slide in and out of the spherical bearing opening.

18. The mounting system of claim 6, wherein the frame bracket includes an elongated lower portion and a frame bracket protrusion extending upward from the elongated lower portion.

19. The mounting system of claim 18, wherein the frame bracket protrusion includes a frame bracket opening and the spherical bearing is disposed within the frame bracket opening.

20. An improved mounting mechanism for use with a rotary damper for a motorcycle having a steering mechanism and a frame assembly, the improvement comprising:

a base mount having a first portion mounted to the steering mechanism and a second portion extending upward from the first portion;

a damping member having a first section rotatably connected to the second portion of the base mount, and a second section for securing the damping member to the rotary damper;

a frame bracket including a spherical bearing and a frame side adapted for mounting the frame bracket to the frame; and a damping arm having one end connected to the spherical bearing and having another end adapted for connecting to the rotary damper.

* * * * *